United States Patent [19]
Cornil

[11] 3,971,399
[45] July 27, 1976

[54] ARRANGEMENTS FOR PREVENTING OR MINIMIZING OVER-PRESSURES IN GAS PIPES

[75] Inventor: Jean-Philippe Cornil, Houilles, France

[73] Assignee: Gaz de France, France

[22] Filed: Oct. 10, 1974

[21] Appl. No.: 513,755

[30] Foreign Application Priority Data
Oct. 11, 1973  France ............................ 73.36355

[52] U.S. Cl. ............................ 137/119; 137/604; 137/608; 138/46
[51] Int. Cl.² ........................................ G05D 11/00
[58] Field of Search ........... 137/604, 608, 119, 609; 138/43, 46

[56] References Cited
UNITED STATES PATENTS

| | | | |
|---|---|---|---|
| 1,052,051 | 2/1913 | Grimes | 137/604 |
| 2,606,573 | 8/1952 | Brobeck et al. | 138/46 |
| 3,110,320 | 11/1963 | Rosenberger | 137/604 |
| 3,134,827 | 5/1964 | Pontow et al. | 137/604 |
| 3,502,308 | 3/1970 | Simizu | 138/46 |
| 3,724,504 | 4/1973 | Matsui et al. | 138/46 |

FOREIGN PATENTS OR APPLICATIONS

| | | | |
|---|---|---|---|
| 531,777 | 8/1955 | Italy | 137/604 |
| 927,644 | 5/1963 | United Kingdom | 137/604 |

*Primary Examiner*—William R. Cline
*Assistant Examiner*—H. Jay Spiegel
*Attorney, Agent, or Firm*—Bucknam and Archer

[57] ABSTRACT

This invention relates to arrangements for the prevention or minimization of over-pressures due to sudden interruptions in the flow of a compressible fluid which are caused by an obturator such as an electrical valve along a main gas pipe and more particularly relates to such arrangements which consist of a pressure regulator and reducer mounted on the said main pipe upstream of the obturator and the response time of which is longer than that of the said obturator, a venturi which communicates with that section of the main pipe which is situated between the obturator and the regulator and reducer, and a buffer reservoir which is in permanent communication with the said section of main pipe via the venturi. According to the invention the regulator and reducer also forms a venturi.

6 Claims, 3 Drawing Figures

ARRANGEMENTS FOR PREVENTING OR MINIMIZING OVER-PRESSURES IN GAS PIPES

BACKGROUND OF THE INVENTION

The present invention relates to arrangements for the prevention or minimisation of over-pressures due to sudden interruptions in the flow of a compressible fluid which are caused by an obturator such as an electrical valve which is situated along a main gas pipe, and particularly such arrangements which consist of a pressure regulator and reducer mounted on the said main pipe upstream of the obturator and the response time of which is longer than that of the said obturator, a venturi which communicates with that section of the main pipe which is situated between the obturator and the regulator and reducer, and a buffer reservoir which is in permanent communication with the said section of main pipe via the venturi. Hereinafter such arrangements will be referred to as "arrangements of the kind described".

Arrangements of the kind described are set forth in French Pat. No. 73.17815 filed May 16 1973 and enable the maximum limits between which the pressure in the fluid varies when such obturators open and close to be kept to a level lower than that at which the safety devices trigger. These safety devices are thus prevented from triggering at the wrong time and the general functioning of the installation is thereby substantially improved.

However, to put an arrangement of the kind described into practice it was necessary to employ and thus to connect together a number of additional valves and pipes and this led to a regulation system which was rather complicated to produce and fit and to a corresponding increase in the cost of the system.

In fact, in the specific embodiment fully described in the aforementioned French Pat. No. 73.17815, the venturi is mounted as a by-pass to the pressure regulator and reducer, with the result that it is necessary to provide, upstream of the venturi, a cut-off valve which shuts off the connection between the said venturi and the main pipe upstream of the pressure reducer and regulator when the obturator is closed.

It is an object of the invention to improve the said known arrangement of the kind described in such a way as to simplify its design, operation and fitting.

SUMMARY OF THE INVENTION

This object is achieved by virtue of the fact that the regulator and reducer is also so arranged as to form a venturi. More particularly, the venturi of the regulator and reducer is formed by the valve seating and the valve in the said regulator and reducer, which seating and valve are so shaped as to define a space which is successively convergent and divergent.

A first advantage of the arrangement according to the present invention thus becomes apparent, this advantage lying in the simplification which results from dispensing with the following members as a result of replacing the separate venturi by the special seating and valve combination provided in the regulator and reducer viz, the venturi, the supply and outlet pipes to and from the venturi, the inlet valve to the venturi and the means for controlling it electrically or hydraulically from the member which controls the obturator on the main pipe. The function of the inlet valve is taken over by the valve of the regulator and reducer itself, and the latter acts directly on the seating/valve system to cause it to open and close at the appropriate time.

In what follows, such a regulator and reducer when fitted with the special combination of valve and seating will be termed a regulator and reducer with built-in venturi.

BRIEF DESCRIPTION OF THE DRAWINGS

The invention will now be explained with reference to the following description of two non-limiting embodiments, which description refers to the accompanying drawings, in which.

SPECIFIC DESCRIPTION OF PREFERRED EMBODIMENTS

Figure 1:
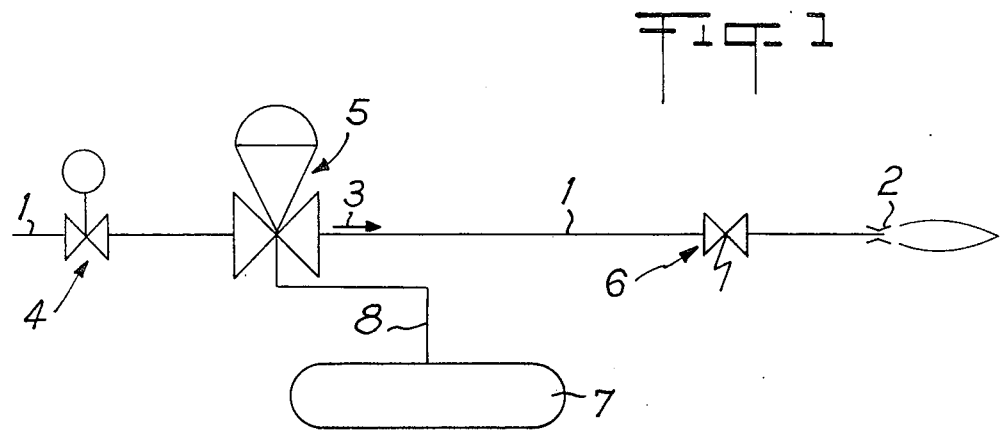
FIG. 1 is a diagram showing the principle of one embodiment of the arrangement according to the invention.

Referring now to the drawings, as can be seen in FIG. 1, the arrangement is intended to be mounted on a main pipe 1 through which a combustible gas flows on its way to a burner 2 which is part of re-heating furnace installation which is not shown.

Along its path through the main pipe 1, the gas passes through in succession and in the direction shown by arrow 3, a safety valve 4, a reducer and regulator 5 with built-in venturi, and an electrical flow-valve 6 of which the type and arrangement are all known.

The arrangement also includes a reservoir 7, when this term is understood to mean a hollow, closed container which contains a space of selected, given volume, the container being connected by a pipe 8 to the venturi which is built-in to the regulator and reducer 5.

Figure 2:
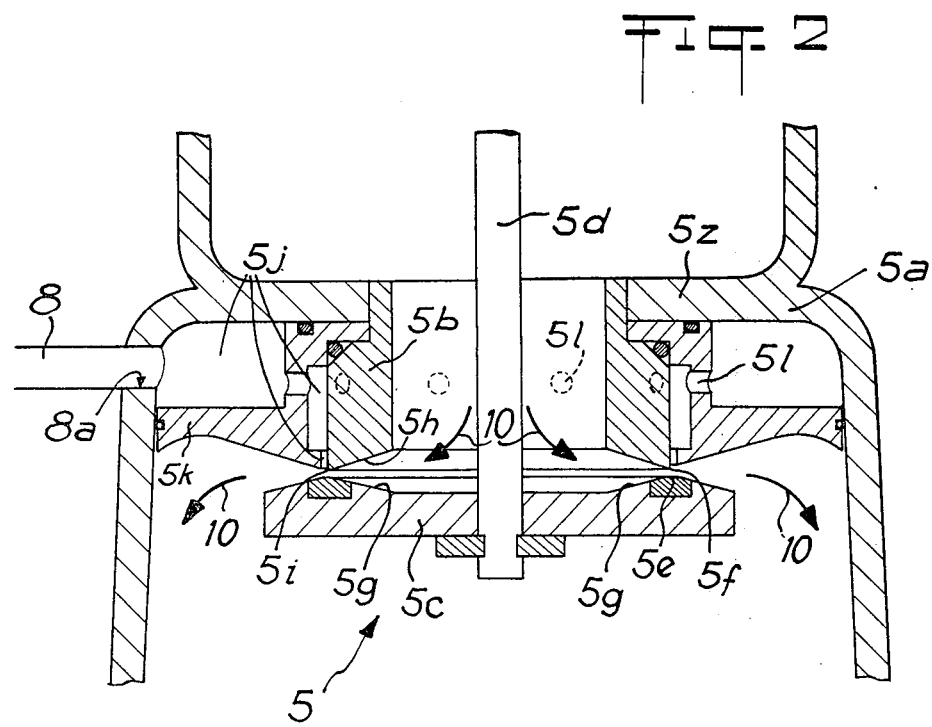
FIG. 2 is an axial cross-section through a first embodiment of the reducer and regulator with built-in venturi.

As shown in FIG. 2, the regulator and reducer 5 is chiefly formed by a body 5a of cylindrical cross-section which is bridged by a transverse partition 5z which separates the upstream part of the regulator from the downstream part where pressure is regulated. This regulation takes place by means of an orifice of variable cross-section which is formed by a circular seating 5b, which is screwed into the said partition 5z, and by a movable circular valve 5c which is caused to move by a rod 5d which is connected to the member controlling the regulator.

Seating 5b and valve 5c are machined into opposite tapers 5h and 5g so that, in any radial cross-sectional plane and in the direction 10 in which the gases flow, they form an annular venturi configuration which first converges and then diverges and the throat of which is formed by the edge 5i of a cylinder whose bases are on the one hand the circular outer lip 5f of seating 5b and on the other hand a circle which is defined by the upper circumference 5e of the valve seal 5c against which the said lip 5f bears when the said valve 5c is closed.

Immediately downstream of this circular lip 5f, i.e. of the area of contact between seating 5b and valve 5c, is provided an annular passage 5j into which opens end 8a of pipe 8. This annular passage 5j is bounded on the one hand by seating 5b and on the other by a circular deflector 5k through which a number of radial passages 5l are bored. This circular deflector 5k is, in addition, so shaped as on the one hand to produce the divergent portion of the venturi and on the other hand to assist the flow of the gases after passing through the said venturi, the venturi now performing the simultaneous functions of an annular venturi and a reducer and regulator which is governed by the position of valve 5c.

This being so, the venturi is radially arranged on either side of a plane perpendicular to valve rod 5d which forms the plane of symmetry of the flow aperture between seating 5b and valve 5c.

The way in which this embodiment operates is as follows:

Let it be assumed that burner 2 is operating; regulator and reducer 5 and valves 4 and 6 will be open and the gas which is flowing in the direction of arrow 3 through the venturi formed by the seating 5b, 5k and the valve 5c of the reducer and regulator 5 will produce a depression in the throat 5e, 5i of the venturi which will be propagated through annular passage 5j and pipe 8 to reservoir 7, inside which a partial vacuum will be created in this way. When valve 6 is closed, the increase in pressure which is produced in the section of pipe downstream of the reducer and regulator 5 as a result of the delay with which this latter closes, is compensated for by the partial vacuum in reservoir 7, which reservoir has been made of the correct size as determined by the physical data involved in the problem, as explained in the aforementioned French Pat. No. 73.17815. Because of the arrangement of the annular passage 5j in relation to seating 5b and seal 5e in valve 5c, reservoir 7 is in permanent communication with the section of pipe situated between regulator and reducer 5 (when it is open) and valve 6. When the electrical 6 opens again, i.e. when the burner 2 is put back in operation, since the gas pressure is very close to the normal supply pressure, the regulator and reducer 5 will open again more rapidly, thus ensuring that burner 2 operates properly.

Figure 3:
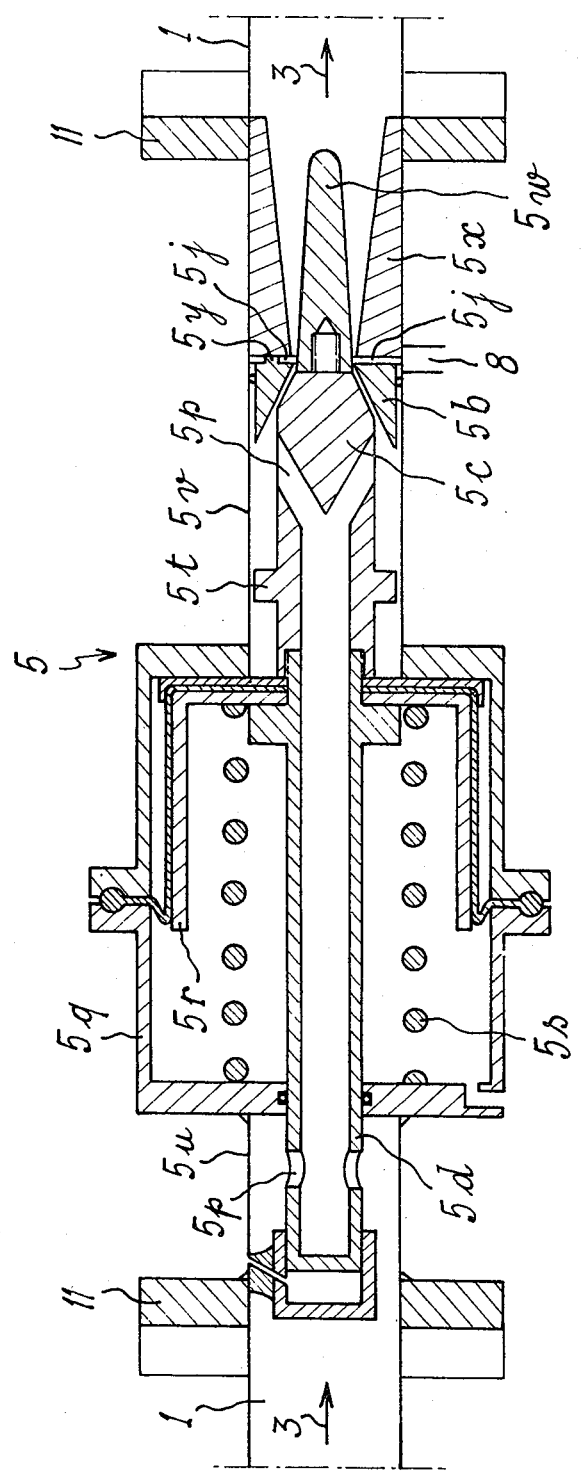
FIG. 3 is an axial cross-section through a second embodiment of the regulator and reducer with built-in venturi.

Whereas in the embodiment shown in FIG. 2 the flow of gas takes place in a radial direction at the point where the venturi is situated, the embodiment shown in FIG. 3 is a regulator and reducer 5 having a built-in venturi in which the flow of gas remains substantially axial, but which has, as does the previous embodiment, a flow cross-section of variable area.

Regulator and reducer 5 is mounted in the main pipe 1 and contains a hollow control rod 5d which is blocked at both ends and which is attached to a conventional control system such as a diaphragm piston 5r, a return spring 5s and cruciform guide-pieces 5t. It should be pointed out that the system for controlling the reducer and regulator does not form part of the present invention and therefore will not be described here in detail. The front and rear parts of the hollow rod 5 fit into tubes 5u, 5v, in such a way as to be movable axially, while the central part of the said rod passes, in a sealed fashion, through a cylinder 5g in which are mounted piston 5r and spring 5s. The interior of the hollow rod 5d communicates with tubes 5u and 5v through bored hols 5p. At the downstream end, considered in relation to the direction in which the gas flows (arrow 3), rod 5d carries the valve 5c, which in this case is formed by a solid body the outline of which takes the form of a truncated cone concentric with the axis of rod 5 and the bottom part of which lies downstream of its major base the diameter of which is the same as that of rod 5d. Valve 5c is surrounded by a seating 5b which is sealed fit in the downstream tube 5v of the reducer and regulator 5 and which is formed by an annular or hollow body the cylindrical outer periphery of which is matched to the shape of tube 5v and the bored hole through which is coaxial with rod 5d and valve 5c, has substantially the same, or a slightly greater, taper than valve 5c, and entirely surrounds this latter. The axial gap between valve 5c and seating 5b thus defines the opening of variable cross-section in the reducer and regulator 5. The minor base of the valve body 5c has attached to it, by a screw for example, a coaxial member 5w of elongated substantially ogival shape, hereinafter referred to as an ogive, the rear part of which is formed by a gently tapering truncated cone and the front part of which is a hemisphere which merges uninterruptedly into the frusto-conical portion. It should be noted that the major base of the ogive 5w which abuts the minor base of the valve 5c is commensurate with or slightly smaller than the latter. Ogive 5w is surrounded by a tubular member 5x which is a sealed fit in the downstream tube 5v of the reducer and regulator 5 and which contains a coaxial hole of frusto-conical shape which is divergent in the direction of its upstream end. The free ends of tubes 5u, 5v are each provided with connecting flanges 11 which allow the regulator and reducer 5 to be fitted into the main pipe 1. The front face of valve seating 5b has a certain number of spacing studs 5y against which the rear face of tubular part 5x presses. In this way is produced the annular passage 5j which is arranged immediately downstream of the area of contact between seating 5b and valve 5c and which is connected, via lateral openings made in the downstream tube 5v and via pipe 8, to reservoir 7.

In this embodiment, the venturi, which extends coaxially to the reducer and regulator 5, allows the gas in the main pipe 1 to flow virtually axially and in as straight a line as possible and it is formed by the seating 5b and the valve 5c which together constitute the annular converging part of the said venturi, by the annular space between the ogive 5w and the lips at the major bases of seating 5b and tubular part 5x, which space constitutes the throat of the said venturi, and by the ogive 5w and the tubular part 5x which constitute the divergent annular part of the said venturi. The angle between the inside wall of part 5x and the wall of the ogive 5w is preferably of the order of 7°.

The embodiment of FIG. 3 operates in a fashion similar to that of the embodiment of FIG. 2.

I claim:

1. In an assembly for preventing or minimising overpressures due to sudden interruptions in the flow of a compressible fluid caused by an obturator such as an electrical valve which is situated on a main gas pipe, said arrangement being of the type which comprises a pressure regulator and reducer, having a valve and a valve seating, said regulator and reducer being mounted on said main pipe upstream of said obturator and the response time of which is longer than that of said obturator, a venturi which communicates with that section of said main pipe which is situated between said obturator and said regulator and reducer, and a buffer reservoir which is in permanent communication with said section of said main pipe via said venturi, the invention which consists in that said regulator and reducer valve and valve seating also forms said venturi.

2. An assembly according to claim 1, wherein, said seating and said valve are shaped to define a space which is successively convergent and divergent.

3. An assembly according to claim 2, wherein said convergent/divergent space forming said venturi is of annular form.

4. An assembly according to claim 1, wherein said venturi is radially arranged on either side of a plane perpendicular to a member operating said valve, said plane forming the plane of symmetry of the flow aperture between said seating and said valve of said regulator and reducer.

5. An assembly according to claim 1, wherein said venturi extends coaxially to said regulator and reducer.

6. A assembly according to claim 5, wherein said venturi has a throat into which opens an annular passage which is connected to said reservoir, said venturi throat being arranged immediately downstream of the area of contact between said seating and said valve.

* * * * *